(12) United States Patent
Axelrod

(10) Patent No.: US 7,851,001 B2
(45) Date of Patent: Dec. 14, 2010

(54) PET CHEWS HAVING INTERNAL AND EXTERNAL MATERIALS OF DIFFERENT RIGIDITY

(75) Inventor: Glen S. Axelrod, Colts Neck, NJ (US)

(73) Assignee: T.F.H. Publications, Inc., Neptune City, NJ (US)

( * ) Notice: Subject to any disclaimer, the term of this patent is extended or adjusted under 35 U.S.C. 154(b) by 1011 days.

(21) Appl. No.: 11/372,992

(22) Filed: Mar. 10, 2006

(65) Prior Publication Data
US 2007/0212456 A1    Sep. 13, 2007

(51) Int. Cl.
A23K 1/00    (2006.01)

(52) U.S. Cl. .................. 426/132; 426/805; 119/709

(58) Field of Classification Search .............. 426/132, 426/805; 119/709
See application file for complete search history.

(56) References Cited

U.S. PATENT DOCUMENTS

| | | | |
|---|---|---|---|
| 2,684,352 A * | 7/1954 | Fisk .................. | 525/57 |
| 4,006,266 A | 2/1977 | Bone et al. | |
| 4,596,736 A * | 6/1986 | Eichhorn et al. .......... | 428/215 |
| 4,900,572 A | 2/1990 | Repholz et al. | |
| 4,954,061 A * | 9/1990 | Repholz et al. .......... | 425/131.1 |
| D374,520 S | 10/1996 | Plunk | |
| 5,811,133 A * | 9/1998 | Saito et al. ............. | 425/145 |
| 5,947,061 A | 9/1999 | Markham et al. | |
| 6,116,191 A | 9/2000 | Suchowski et al. | |
| 6,202,598 B1 | 3/2001 | Willinger | |
| 6,305,326 B1 | 10/2001 | Suchowski et al. | |
| D450,894 S | 11/2001 | Suchowski et al. | |
| 6,360,695 B2 | 3/2002 | Suchowski et al. | |
| 6,415,741 B2 | 7/2002 | Suchowski et al. | |
| 6,468,458 B1 | 10/2002 | Anderson et al. | |
| 6,474,268 B1 | 11/2002 | Suchowski et al. | |
| 6,672,252 B2 | 1/2004 | Levin et al. | |
| 6,682,809 B2 * | 1/2004 | Van Rheenen ............ | 428/220 |
| 6,949,595 B2 | 9/2005 | Morgan et al. | |
| 6,972,133 B1 * | 12/2005 | Denesuk et al. ........... | 424/484 |
| 6,981,471 B1 | 1/2006 | Dubinins et al. | |
| 7,246,113 B2 * | 7/2007 | Cheetham et al. ......... | 707/741 |
| 2003/0079693 A1 | 5/2003 | Jager | |
| 2004/0082263 A1 * | 4/2004 | Parrish ................. | 446/245 |
| 2005/0166865 A1 | 8/2005 | Handelsmak et al. | |
| 2005/0255184 A1 | 11/2005 | Maupin | |
| 2006/0188611 A1 | 8/2006 | Unlu et al. | |

OTHER PUBLICATIONS

Deanin, Polymer Structure, Properties and Applications, Canhers Publishing Co., p. 296, 1972.*

(Continued)

*Primary Examiner*—C. Sayala
(74) *Attorney, Agent, or Firm*—Grossman, Tucker, Perreault & Pfleger, PLLC

(57) ABSTRACT

The present invention relates to an animal chew toy and a method of providing an animal chew toy wherein the toy has a body portion and a core portion. The core portion includes a first material including a central portion and a plurality of projections extending from the central portion. The body portion may surround the core portion, encapsulating the core or forming a frame around the core. The chew may be formed via a number of overmolding methods including those utilizing injection molding or extrusion techniques.

10 Claims, 6 Drawing Sheets

OTHER PUBLICATIONS

Hartz Dental Chew 'N Clean Teething Ring Dog Toy. www.hartz.com. Mar. 3, 2006. 1 pg.

Hartz Dental Chew 'N Clean Bones Dog Toy. www.hartz.com.Mar. 3, 2006. 1 pg.

Hartz Dental Chew 'N Clean Deli Cuts Dog Toy. www.hartz.com. Mar. 3, 2006. 1 pg.

Hartz Dental Chew 'N Clean Dental Duo Dog Toy/Edible Chew. www.hartz.com. Mar. 3, 2006. 2 pgs.

* cited by examiner

PET CHEWS HAVING INTERNAL AND EXTERNAL MATERIALS OF DIFFERENT RIGIDITY

FIELD OF INVENTION

The present invention relates to an animal chew that provides a core portion and a body portion, wherein the core portion has different properties than the body portion. In particular, the present invention relates to a body having a first hardness and a core portion having a second hardness. The present invention also relates to providing a chew wherein the body may be relatively clear and the core may be luminescent and/or flavored.

BACKGROUND

Most dogs enjoy chewing on things, although preferences vary as to the hardness of the substances favored. Some dogs like to chew on very hard materials such as cow bones, wood and nylon, while others prefer softer chews such as polyurethane or rubber. Still others favor freeze dried snacks. Some dogs due to their age may not be able to chew on very hard substances. Young dogs may have insufficiently developed teeth, while old dogs may have diseased gums or may have lost some of their teeth.

Furthermore, chew toys may be used as a vehicle to provide interaction between dogs and people. For example, some people like to play fetch with dogs using sticks, balls, flying disks, etc. Other people like to play "tug-of-war" with their animals, using ropes, sticks, etc. The interaction between pets and their owners has reportedly been found to be not only beneficial to the pet, as it provides the pet with necessary exercise and companionship, but beneficial to their owners as well, with many reported health related benefits.

Accordingly, the prior art is replete with disclosures directed at forming a variety of chew toys. However, there is still a need to provide chew toys that fulfill other requirements. For example, it may also be useful to provide pet chews that are interesting not only to pets, but to the pet owners as well. Additionally, it may also be useful to provide pet chews that enhance the feel of the chew to the pet or owner. Accordingly, a pet toy of novel construction may be directed to sparking the interest of, not only the pet, but children, teenage or adult owners, which may increase the time period that owners engage with their animals.

In addition, it may also be helpful for pet owners to provide chew toys that are not only novel in construction but are luminescent in nature, such as fluorescent or phosphorescent toys. Chew toys providing luminescence may be easier for the pet owner to spot or retrieve. Luminescent chew toys may also provide the ability to extend outdoor play time past twilight. Accordingly, greater interest or the ability to extend play time may increase the beneficial time spent between the pet owners and their pets.

SUMMARY

An aspect of the present invention relates to an animal chew comprising a first material having a central element and a plurality of projections extending from the central element. A second material may encompass the first material.

Another aspect of the present invention relates to an animal chew including a core. The core may include a first material having a first hardness. A frame including a second material having a second hardness may surround the core. The first hardness may be greater than the second hardness.

A further aspect of the present invention relates to a method for forming an animal chew. A first material may be formed into a first configuration including a central element and a plurality of projections extending from the central element. A second material may be formed into a second configuration around the first material.

Yet a further aspect of the present invention relates to a method of forming a pet chew. A second material may be formed into a first configuration, wherein the first configuration comprises a void space. A first material may then be formed in the void space.

BRIEF DESCRIPTION OF DRAWINGS

The detailed description below may be better understood with reference to the accompanying figures which are provided for illustrative purposes and are not to be considered as limiting any aspect of the invention.

DETAILED DESCRIPTION

The present invention relates to an animal chew that provides a first material and a second material, the first material being surrounded by the second material. In particular, the first material may form a central element and may include a plurality of projections extending from the central element.

The present invention also relates to providing a first material that may have a first hardness and the second material that may have a second hardness, less than the first hardness. In addition, a chew may be provided wherein the first material may be luminescent and the second material may be relatively clear. The pet chew may also include an attractant. The pet chew may be processed by a number of over-molding processes such as insert molding, multiple component molding or extrusion techniques.

Figure 1:
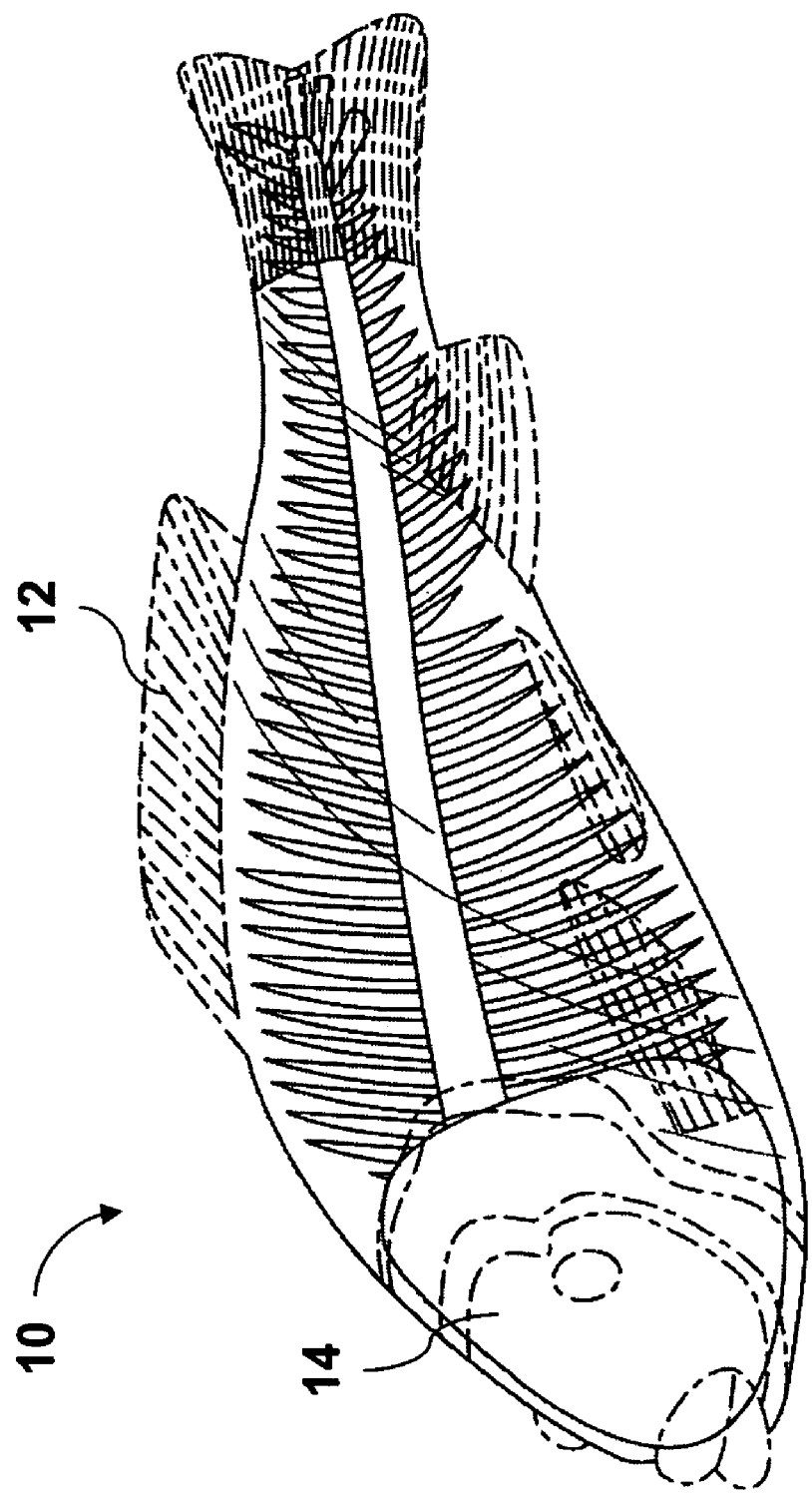
FIG. 1 is a perspective view of an exemplary embodiment of the present invention.

In an exemplary embodiment, as illustrated in FIG. 1, a pet chew 10 may assume the shape of a fish and include a body portion 12 and a core portion 14. As can be seen from the illustration, the core 14 of the pet chew 10 may be configured differently from the outer body of the pet chew 12. The core portion 14 may also provide support for the body portion 12. The features and textures of the chew are illustrated in phantom and may vary depending on the desired configuration of the pet chew.

Figure 2:
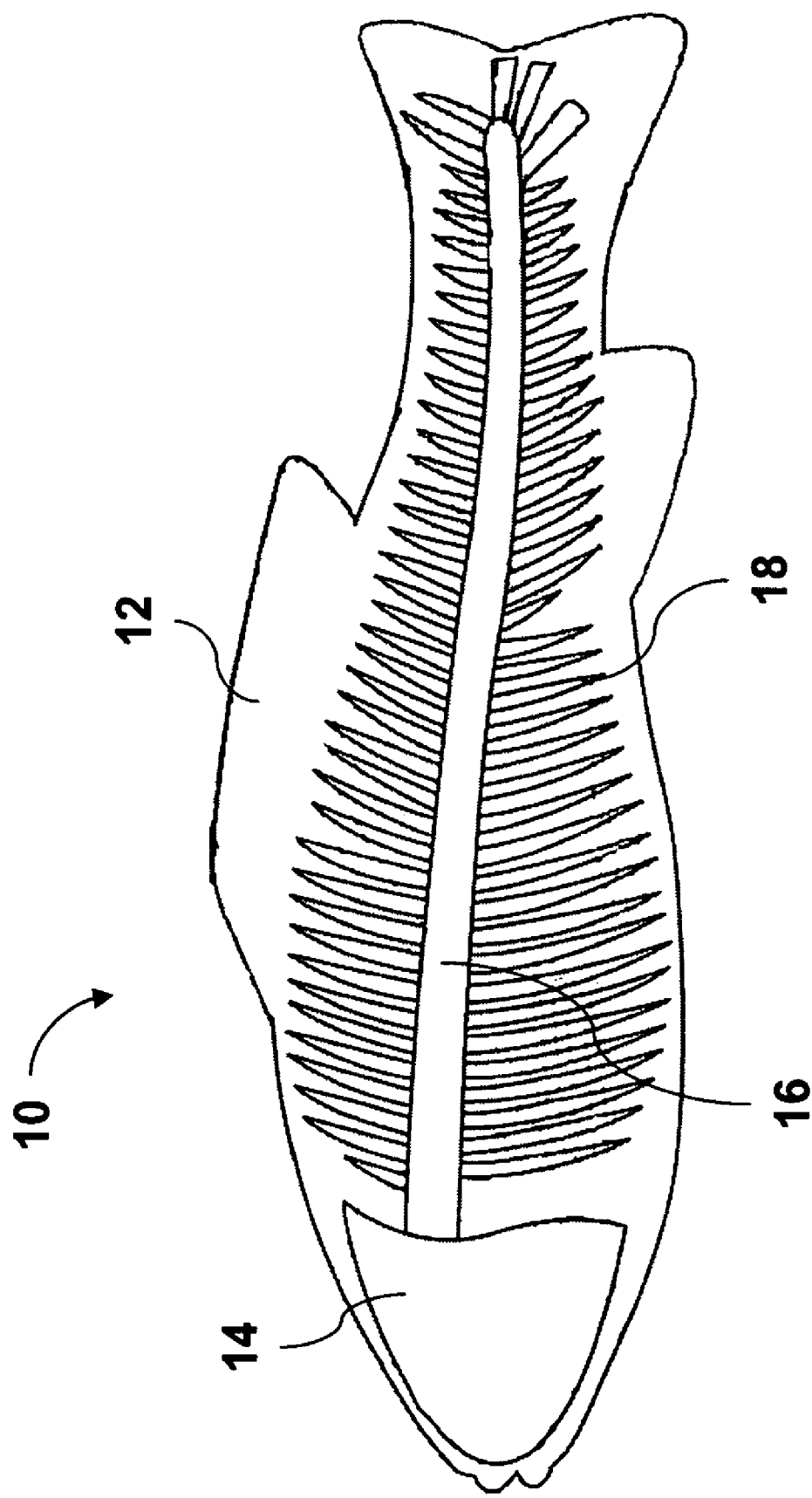
FIG. 2 is a cross-sectional view of the exemplary embodiment of FIG. 1.

FIG. 2 illustrates a cross-sectional view of the pet chew 10 taken down the length of the pet chew 10. The core portion 14 may include a central portion 16 and a plurality of projections 18 extending from the central portion 16. The projections 18 may be of similar or varying geometry. The projections may have a diameter or thickness equal to or smaller than the diameter or thickness of the central portion.

Figure 3:
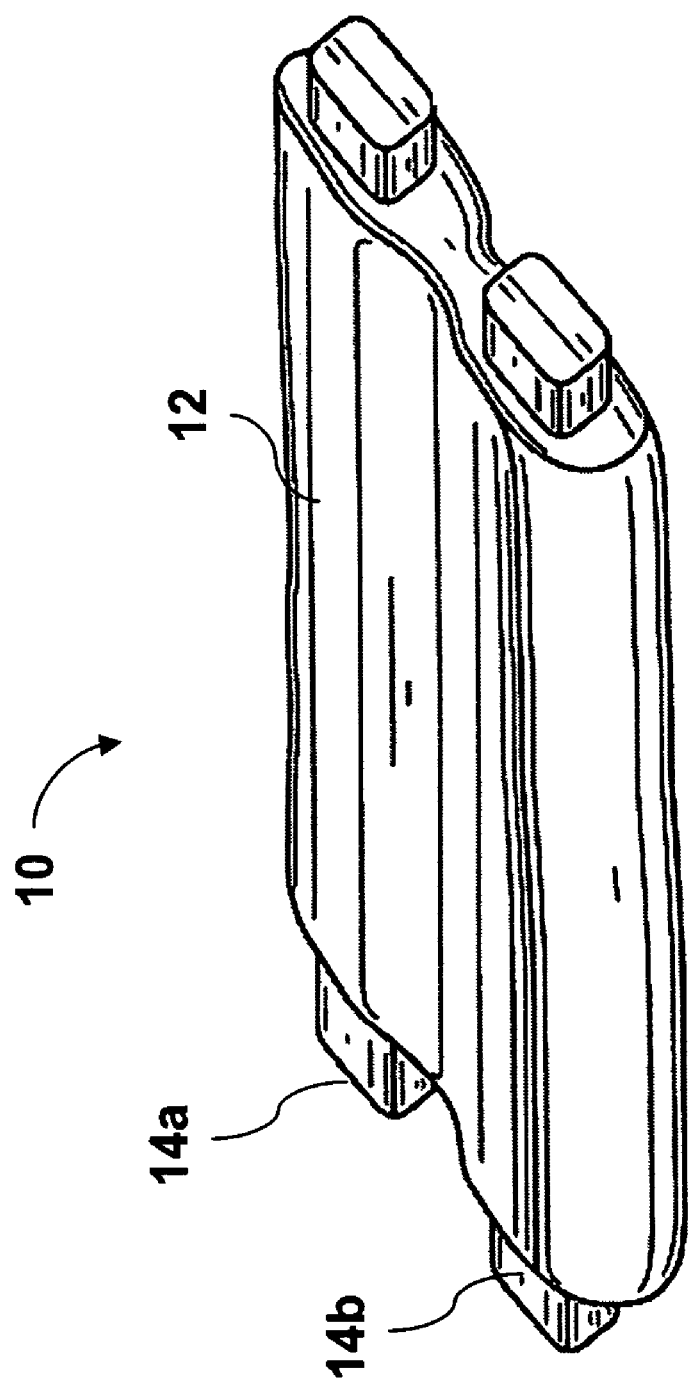
FIG. 3 is a perspective view of an exemplary embodiment of the present invention.
Figure 4:
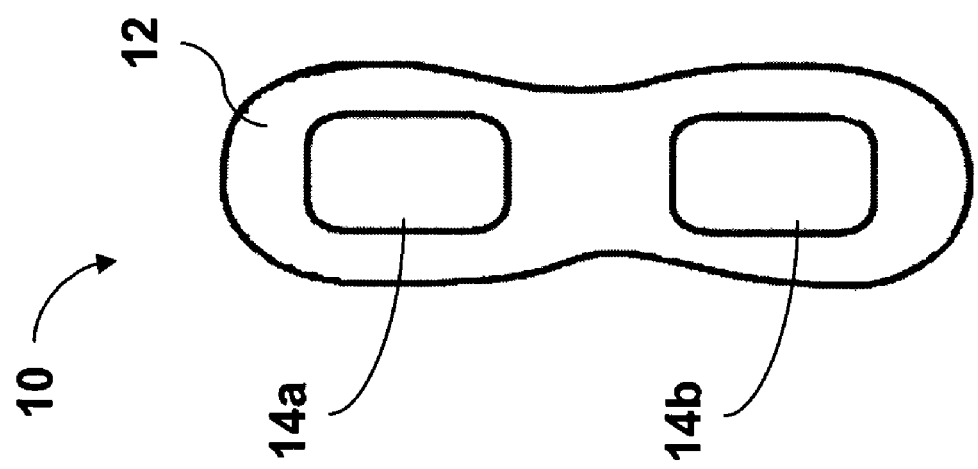
FIG. 4 is a cross-sectional view of the exemplary embodiment of FIG. 3.

FIG. 3 illustrates another exemplary embodiment of a pet chew 10, which may assume the shape of spare ribs. FIG. 4 is a cross-sectional view of the pet chew 10 of FIG. 3. As can be seen from the figures, the core portion may be formed from more than one element 14a and 14b, which may or may not (as illustrated) include projections. Furthermore, as illustrated in FIG. 3, the body may not completely surround the core portions 14a and 14b, but only surround a portion of the core of the pet chew. In an exemplary embodiment, the body may surround at least 50% of the mass of the core 14, including all increments and values therein. It should therefore be appreciated that core portions 14a and 14b may be individually or differently flavored, and/or be made to provide a "glow in the dark" luminescent effect. In addition, body portion 12 may also be selectively flavored, or made luminescent, and may be made from a material that provides a lower hardness than the material of core portions 14a and/or 14b.

Figure 5:
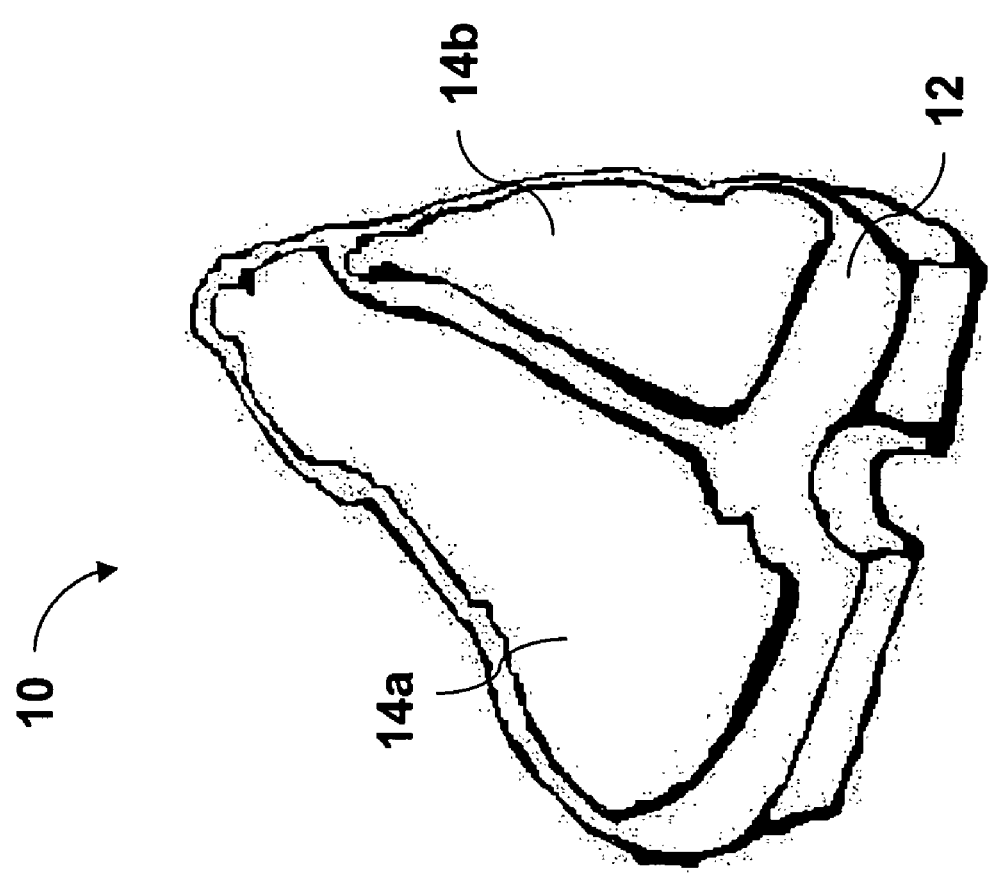
FIG. 5 is a perspective view of an exemplary embodiment of the present invention.

FIG. 5 illustrates a further exemplary embodiment of a pet chew 10, which may assume the configuration of a t-bone or porterhouse steak. The outer body 12, assuming the appearance of fat or bone structure may form a frame about a core portion 14a and 14b. Core portions 14a and 14b may assume the appearance and configuration of meat. It should be appreciated that one or more core portions (as illustrated) may be presented, such as one core portion, two core portions, three core portions, etc.

The core portion and body portion may be formed of a first material and a second material respectively. The materials may include thermoplastic or thermoset materials, including rubber materials and thermoplastic elastomers. For example, the materials may include polyurethane, nylon, nylon copolymers, styrene-butadiene copolymers, polyether-amide copolymers, silicone, polycarbonate, polycarbonate copolymers, natural rubber, etc. It should be appreciated that the first and second materials may be the same, wherein, specific properties of the material, such as the hardness, color or light transmitting capacity of the material may be altered.

In addition, the first and/or second material may also include an edible resin composition. Edible resin compositions may include any starch or carbohydrate of natural or vegetable origin. The starch may include amylose and/or amylopectin and may be extracted from plants, including but not limited to potatoes, rice, tapioca, corn and cereals such as rye, wheat, and oats. The starch may also be extracted from fruits, nuts and rhizomes, or arrowroot, guar gum, locust bean, arracacha, buckwheat, banana, barley, cassaya, konjac, kudzu, oca, sago, sorghum, sweet potato, taro, yams, fava beans, lentils and peas. The starch may be present in the edible resin composition between about 30-99% including all increments and values therebetween such as levels above about 50%, 85%, etc.

The starch employed herein may be raw starch, which may be understood as starch that has not seen a prior thermal molding history, such as extrusion or other type of melt processing step where the resin is shaped in the presence of heat. The raw starch itself may also be native, which may be understood as unmodified starch recovered in the original form by extraction and not physically or chemically modified. The raw starch may also be in powder form of varying particle size, which may be in the range of about 1-2,000 μm, including all ranges and increments therein. Raw starch may be understood as milled and/or pre-sifted starch. It should be understood that the raw starch may also have varying degrees of moisture present. In one embodiment moisture may be present in the raw starch between 1-60%, including all increments and values therebetween such as 40%, 20%, 10%, etc.

The edible resin compositions herein may be sourced from Manildra Group USA, under the following tradenames: "GEMSTAR 100" which is a refined food grade wheat starch; "GEMSTAR100+" which is a refined food grade wheat starch; "GEM OF THE WEST VITAL WHEAT GLUTEN" which is a powder product by low temperature drying of gluten extracted from wheat flour; "ORGANIC GEM OF THE WEST VITAL WHEAT GLUTEN" which is a powder product by low temperature drying of gluten extracted from organic wheat flour; "ORGANIC GEMSTAR 100" which is a wheat starch extracted from organic what flour; and/or "ORGANIC GEMGEL 100" which is a pregelatinized organic wheat starch In addition, the resin composition may be sourced from ADM under the tradename "EDIGEL 100" which is a wheat resin composition; "AYTEX P" which is a unmodified food grade wheat starch.

Other edible resin materials may be contemplated that may be derived from animal sources such as casein, denatured or hydrolyzed casein, collagen, denatured or hydrolyzed collagen, rawhide, gelatin, other animal protein products, such as animal meal. The resin material may also be derived from plant matter such as gluten, vegetable matter, nuts, such as nut flour, paste or bits, fruit matter, etc. It should also be appreciated that the various edible resin materials, (i.e. starch, animal derived sources, and plant derived sources) may be blended with other edible resin compositions, thermoplastic materials, and/or thermoset materials.

For example, glutens may be incorporated into the edible resin composition. Gluten may be understood as water-insoluble protein complex extracted from cereal grains such as maize or corn and wheat. The gluten may be present individually or cumulatively between about 0.1-50% by weight of the resin composition and all increments and values therebetween including 0.1-5.0%, 15%, 25%, etc.

In addition various additives may be incorporated into the edible resin compositions. For example, the edible resin compositions may include cellulose. The cellulose may be, for example, a long-chain polymer of polysaccharide carbohydrate. The cellulose may also be derived or extracted from plants. The cellulose may be incorporated into the resin composition between about 1-15% by weight of the resin composition and any increment or value therebetween including 4%, 10%, 11%, etc.

Emulsifiers or surfactants may also be incorporated into the edible resin compositions. The emulsifier may be present between about 1-10% by weight of the resin composition and all increments or values therebetween including 3%, 4%, etc. The emulsifier may include, for example, lecithin, which may be extracted or derived from, for example, egg yolk or soy beans.

The edible resin compositions may also include a plasticizer. The plasticizer may include for example, glycerin. The plasticizer may be incorporated between about 15-30%, including all increments and values therebetween such as levels greater than 15%, 21%, 27% etc.

A humectant may also be incorporated into the edible resin composition. The humectant may include, for example, oat fiber. The humectant may be incorporated between about 0.1-5% by weight of the resin composition including all intervals and values therebetween, including 1%, 25%, etc. A humectant may be understood to be any additive that may absorb water in the material.

The edible resin composition may also include water. The water may be introduced into the composition between about 1-40% by weight of the edible resin compositions and any increment or value therebetween, including 4%, 20-40%, 10-20%, etc. After the product has been formed, the water may be present between 1-20% by weight of the resin composition including all increments or values therebetween, such as, below 20%, 4%, 5-10%, etc.

The first and/or second materials (i.e. the edible resin compositions, thermoplastic and/or thermoset resins) may generally include a nutraceutical. The nutraceutical may be fermented soya. Fermented soya nutraceuticals are available from Bio Food, Ltd., Pine Brook, N.J. and sold under the general trademark Soynatto®. The fermented soya is present between about 1-40% by weight of the resin composition, including all increments and values therebetween, including 10%, 20%, etc.

The first and/or second materials may also include enzymes and/or co-enzymes which are similarly available through Bio Foods, Ltd., Pine Brook, N.J. and sold under the trademark of BT-CoQ10®. This reportedly is a biologically transformed (fermented) cell mitochondrial coenzyme and contains Coenzyme Q10, antioxidants, phytonutrients and cofactor mineral nutrients and other cell constituents. The enzymes and/or co-enzymes may be present between 0.1-10% by weight of the resin composition, including all increments and values therebetween such as 1%, 5%, etc.

In addition, herbal extracts, vitamins, minerals, colorants, yeast products, soy products, attractants, etc., may also be incorporated into the first and second material. Yeast products, for example, may include nutritional yeast or brewers yeast such as saccharomyces cerevisiae, dairy yeast such as kluyveromyce marxianus or wine yeast such as saccharomyces fermentati. It should be appreciated that, the first material may be provided with a first colorant, attractant, yeast product, etc. and that the second material may be provided with a second colorant, attractant, etc.

In an exemplary embodiment, the core material may have a first hardness, flexural modulus or tensile strength which is greater than the corresponding values for the body portion. For example, the core portion may have a Shore A durometer of greater than 70, including all values and increments therein up to 100, e.g. 80, 90, etc. The body portion may have a Shore A durometer of less than 100, including all values and increments therein to about 20, e.g. 50, 70, etc. In addition, the flexural modulus of the core section may have a value of greater than 100,000 psi, and the flexural modulus of the body may have a flexural modulus of about or less than 100,000 psi. The tensile strength of the first material may be about or greater than 10,000 psi, and the tensile strength of the second material may be less than about 10,000 psi.

Along such lines, it may be appreciated that the core section may therefore provide suitable rigidity to provide support for an outer body section that would otherwise sag or be unacceptable for a pet chew toy application. In addition, the selection of materials for the core and body may be controlled such that there is sufficient bonding at the interface of the two materials, and the materials do not provide a phase separation boundary at such location. Accordingly, the material of the core may be selected to be compatible with the material of the body, meaning that the materials will not generally phase separate along their boundary line.

In order to optimize the bonding of the core with the body, the materials may also be selected so that during injection molding, the surface of the core may melt a sufficient amount in the presence of the body material so that the materials tend to melt bond. To achieve such a result the melting or softening temperature of the surface of the core material may be controlled to be within about +/−10° C. of the melting or flow temperature of the body material.

With respect to the compatibility requirement, the core material may therefore be selected so that it may have a solubility parameter ($\delta_1$) that is within +/−5 units $(cal/cm^3)^{1/2}$ of the solubility parameter value of the body ($\delta_2$), including all values and increments therein, such as with in +/−1-2 units, +/−0.25-1 units, etc. Within such limits it is contemplated that the compatibility and phase separation may be controlled to acceptable levels.

Surface treatment of the core material is another option which may similarly provide for suitable bonding of the outer material. For example, the core material may be first prepared and the surface may be treated with a suitable adhesive resin (e.g., a pressure sensitive adhesive or a hot melt adhesive such as poly(ethylene-co-vinylacetate). In an exemplary embodiment, the adhesive may be coated onto the core material, by methods such as spray coating, dip coating, powder coating, etc. In another embodiment, the adhesive may be injection molded onto the core material. In addition, the surface of the core material may be exposed to plasma treatment or corona discharge to improve bonding. It may also be possible to provide the body material with an adhesive component or functionality which may promote adhesion between the body material and the core material. It should also be appreciated that the body material may likewise be treated with an adhesive and/or the core may be provided with an adhesive component or functionality.

Suitable bonding may also be provided by utilizing mechanical interference between the core material and the body material. For example, the core and body material may be chosen such that the body material has a greater shrinkage than the core material, thus creating a shrinkage fit due to differential shrinkage. In that regard, the core material may have a volumetric shrinkage that is in the range of about 1% to 10% less than the shrinkage of the body material, including all values and increments therein. It should be appreciated that the volumetric shrinkage may be isotropic or anisotropic.

As alluded to above the core material (thermoplastic, thermoset or edible material) may be luminescent and may include a luminescent additive. Luminescence may be understood as light generated by, for example, chemical or biological change, subatomic motion, crystalline reaction, or stimulation of an atomic system. The luminescent chews may be, for example, fluorescent or phosphorescent.

Fluorescence may be understood as a process in which a high-energy photon may be absorbed and re-emitted as a lower-energy photon having a different or longer wavelength. The re-emission of the photons may occur on the order of a few seconds to a few minutes, including all ranges and increments therein, e.g. 0.01 seconds to 10 minutes. Exemplary fluorescent colorants may be based on aromatic structures such as xanthenes, rhodamines, aminonaphthalimides, perinones, and thioindigos based colorants.

Phosphorescence may be understood as a process in which energy stored in a substance is released very slowly and continuously in the form of glowing light. The release of energy stored in phosphorescent materials may be over a relatively long period of time, from a few seconds to a few hours, including up to 24 hours. Exemplary phosphorescent materials may include zinc sulfide crystals with copper and/or manganese activator; calcium and strontium sulfide activated with bismuth; crystalline structures of metal oxide aluminates, containing one or more of strontium, calcium, magnesium, barium and activated by europium and at least one or more co-activators including ytterbium, dysprosium, neodymium, samarium, thorium, thulium, erbium, etc.

The luminescent additive may be added to the core material in the range of about 0.1% to 50% by weight, including all values and increments therein. The average particle size may be between 0.1-100 microns including all increments and values therein. The luminescent additive may also be spherical or acicular in shape.

The body material may be made of a relatively clear polymeric material. For example, the body material may include a material that is capable of transmitting about or greater than 50% of visible light, including all values therein. The body material may also be capable of transmitting greater than 50% of UV radiation, including all values therein. Transmittance may be understood as the ratio of light transmitted through the material to the incident light. The body material may also have a haze of less than 50%, including all values therein. Haze may be understood as the amount of light scattered from within or from the surface of a specimen. Accordingly, the luminescent core may be at least partially visible through the body material.

The body material may also include a luminescent additive and/or may be tinted a variety of colors and include a number of fillers that may effect the scattering of the light through the material. As alluded to above, the body material may also include a texture, (illustrated in FIG. 1 by the lines in phantom) which may be understood herein as regular or irregular features, such as protrusions or depressions, located on the surface or near surface of the body. The texture may be incorporated on only a portion of the chew or may be incorporated over the entire chew surface. Furthermore, the texture may vary across the surface of the chew. It should be understood that the haze and transmittance of the body materials may be altered by the texture on the surface.

The body and/or core material may also incorporate an attractant. The attractant may be present between about 0.1% to 10% by weight of the polymeric material, including all ranges and increments therein. The attractant may be an olfactory stimulant or a flavoring. Exemplary attractants may include the meal or by-products of fish, meat, poultry, etc. In addition, the attractants may include animal digests. By animal digest it is meant to include a substance made by taking relatively clean and relatively undecomposed animal tissue and breaking it down utilizing chemical or enzymatic hydrolysis. The animal digest may include hydrolyzed liver, e.g., hydrolyzed poultry liver. In addition, the animal digests may not contain hair, horn, teeth, hooves or feathers, which may be present in unavoidable trace amounts. The animal digests may be obtained, for example, from Applied Food Biotechnology Incorporated, O'Fallon, Mo., and sold under the trade name Optimizor®. The attractants may be provided in a number of forms such as liquid or powder. It may also be provided as a concentrate.

A coating may also be formed on the body to provide various visual effects or to provide the attractant. The coating may include a polymeric material which may be over molded, dip coated, etc. onto the chew. The coating may include for example, various pigments, such as pearlescent or metallic pigments to better mimic the desired body configuration. However, it should be appreciated that, like the body, the coating may be transparent.

An exemplary method of forming the animal chew may include molding the core portion of the chew. The core may be molded by any number of melt conversion processes. It should be appreciated that melt conversion processes may include injection molding, extrusion, etc. The body portion may then be molded over the core portion of the chew. Various over-molding techniques may be used to form the body portion. For example, the body portion may be co-extruded with the core portion or over-extruded onto the core portion once the body portion has been formed. The body portion may be injection molded over the core portion using techniques such as insert molding, rotary molding, shuttle molding, etc.

Figure 6:
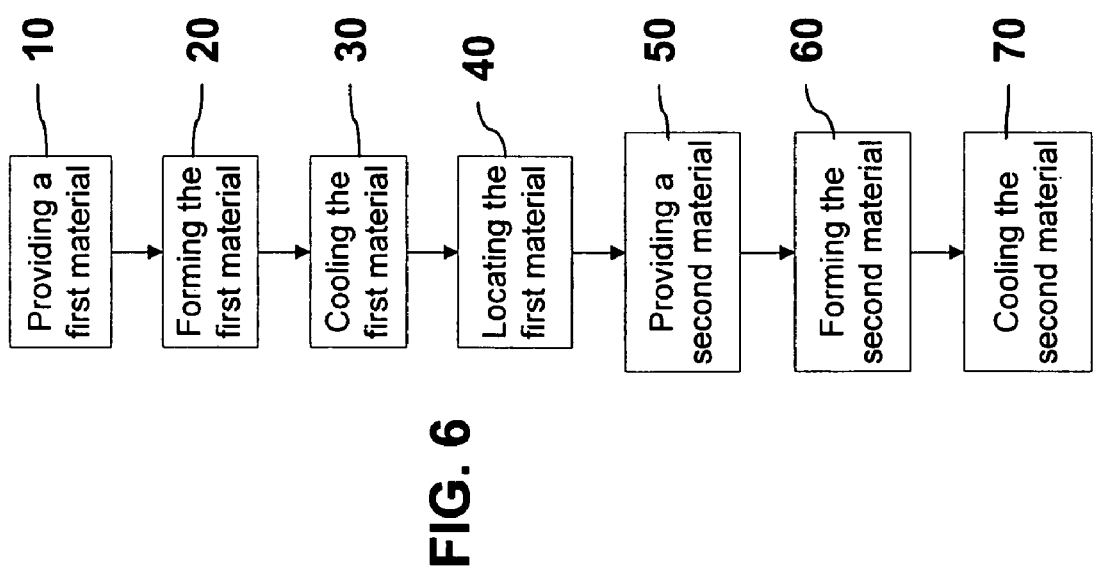
FIG. 6 is flow diagram of an exemplary method which may be used to form a device contemplated by the present invention.

FIG. 6 illustrates an exemplary embodiment of a method for forming the chew toys described herein. The core portion of the chew may be formed by providing a first material 10 that may have a first property such as hardness or luminescence. Once provided, the first material may be formed into a first configuration 20 by injection molding, for example, wherein the first material may be melted and forced into a mold cavity. The first material may be allowed to cool 30 to at least a partially solidified state, wherein the modulus of the first material is sufficient for the material to support itself upon removal from the mold cavity. For example, an approximation of such temperature is when the center of the core material may be cooled to +/−15° C. degrees of the heat distortion temperature or Vicat softening temperature of the material, including all ranges and increments therebetween.

The heat distortion temperature may be understood as the temperature in which a specimen subject to three-point bending deflects a fixed distance under a specified load. An exemplary testing method for determining the heat distortion temperature may include ASTM standard D648. The Vicat softening temperature may be understood as the temperature at which a lightly loaded flat pin penetrates a fixed distance into a test specimen. An exemplary testing method for determining the Vicat softening temperature may include ASTM standard D1525. Both of these points provide an indication of the intrinsic resistance of a thermoplastic material to distortion or warpage at elevated temperatures.

The core portion may be transferred or otherwise located into a second mold cavity that provides a second configuration for the body of the chew 40. It should be appreciated that the second mold cavity and the first mold cavity may be two different cavities or may the same cavity wherein the first cavity is configurable through the activation of moving cores. The first mold cavity may also form a portion of the second mold cavity or vice versa. Optionally, the core portion may be treated, such as with an adhesive or other bonding treatment, before or after transferring or otherwise locating the chew into a second mold cavity.

A second material forming the body having a second hardness or relative transparency may then be provided 50. The second material may be melted and formed over the first material into a second configuration 60. As alluded to above, the melt temperature of the core material may be within about +/−10° C. of the melting or flow temperature of the body material for the purpose of providing melt bonding. The material may then be allowed to cool 70 to the point where it has sufficient modulus to support itself when removed from the mold.

It should also be appreciated that in an exemplary embodiment, the body may be molded first and the core portion may be molded into the body. A mold cavity may be provided with one or more mold segments that extend into the mold cavity to form a portion of the mold cavity surface. The mold segment may also retract providing a cavity for the core portion to be formed. Mold segments may be understood as a protrusion, or set of matching protrusions, which may form surfaces of a molded article, such as inner or exterior surfaces and may be positioned within the cavity parallel to, perpendicular to or at various angles to the direction of injection of the polymer material. The extension and retraction of the mold segments may be facilitated by the use of hydraulically, pneumatically or electrically activated plates, cams, actuators, etc.

In such a manner, once molded, the body portion may form a surface against which the core portion may be formed. For example, in forming the spare ribs of FIG. 4, the body material or meat portion of the ribs may be formed around mold segments extended into the mold. Once the meat is formed, the mold segments may be retracted and the bone or core portion of the ribs may be formed. In another example, in forming the t-bone of FIG. 5, the body material of the steak may be formed around mold segments extended into the mold to create a frame. Once formed, the mold segments may be retracted providing a cavity surface in conjunction with the frame to form the core or meat portions.

Figure 7:
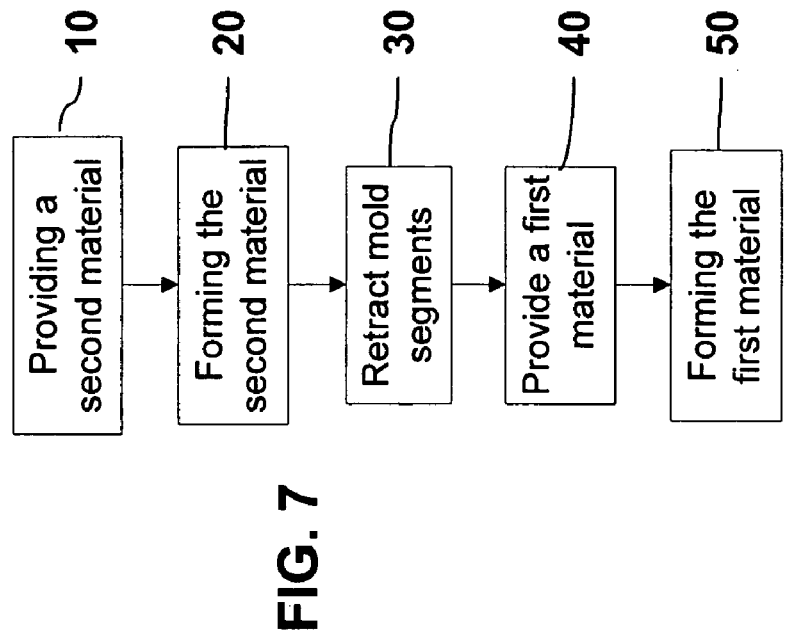
FIG. 7 is flow diagram of an exemplary method which may be used to form a device contemplated by the present invention.

FIG. 7 illustrates another exemplary embodiment of a method for forming the chew toys described herein. The body portion of the chew may be formed by providing a second material that may have a second hardness or may be relatively clear 10. Once provided, the second material may be formed into a first configuration 20 by injection molding, for example, wherein the second material may be melted and forced into a mold cavity. The mold cavity may include mold segments that are extended into the mold cavity forming to form void spaces in the second material.

The second material may be allowed to cool to at least a partially solidified state, wherein the modulus of the second material is sufficient for the material to support itself under the injection force of the first material. Injection force of the first material may be dependent upon the viscosity of the first material at a given temperature, part geometry, and tool geometry. The mold segments may then be retracted to form the void spaces in the second material 30 which may provide additional surfaces upon which a first material or the core material may be formed.

A first material forming the core portion may then be provided 40. The material may be provided by combining the luminescent additive with the first material by melt blending or dry blending. It should be understood that in melt blending the viscosity of polymeric material is lowered to a liquid or semi-liquid state and may be performed by extrusion techniques such as twin screw extrusion or may be blended in the barrel of an injection molding machine prior to forming. In dry blending, the polymeric material is maintained at a solid or semi-solid state. The additive in either case, i.e. melt blending or dry blending, may be provided in either pigment or dye form.

The first material may be melted and formed into a second configuration 50 within or partially within the formed void space. The material may then be allowed to cool to a point where it has sufficient modulus to support itself when removed from the mold.

In another exemplary embodiment, the core and body may be formed by extrusion. For example the core and body may be formed at the same time via co-extrusion, wherein the core is overmolded by the body portion while both the first and second materials are in a melt or semi-melt state. In another exemplary embodiment, the core may be formed and then the body portion may be extruded over the core portion.

In yet another exemplary embodiment, the core material may have a first configuration and the body of the chew may have a second configuration that is different from the first configuration. For example, the core may be formed into an internal structure that may resemble a vertebrate or an invertebrate such as one or more bones, or a skeletal system, a muscular system, a neurological system or a circulatory system. The body may form the body of the vertebrate or invertebrate and take on a number of shapes, such as a fish, a bug, a worm, etc. The body and core may also take on the shape of food items such as spare ribs, lamb chops, chicken bones, spiral ham, pork chop, t-bone steaks, etc.

It should also be appreciated that more than just a first material and a second material may be contemplated by the present invention. For example, three or more materials may be included to form various configurations of the pet chew. In one embodiment, the pet chew may include a first core material, a second body material, a third core material and a forth body material, and so forth, wherein the first and third core materials provide one property and the second and forth core materials provide a second property.

The foregoing description is provided to illustrate and explain the present invention. However, the description hereinabove should not be considered to limit the scope of the invention set forth in the claims appended here to.

What is claimed is:

1. An animal chew comprising:
   a core comprising a first material having a central element and a plurality of projections extending from said central element, said central element and a plurality of projections having an outer surface wherein said core is colored and wherein said projections have a thickness and said core has a thickness where said thickness of the projections are less than the thickness of the core;
   a body portion comprising a second material that surrounds said core, said body portion having an inner surface melt bonded against at least a portion of said outer surface of said first material and said plurality of projections;
   wherein the core has a first skeletal configuration and the body has a second configuration that is different from said core first configuration and comprises a body of a vertebrate or invertebrate;
   wherein said first material has a softening temperature and said second material has a softening temperature and said softening temperature of said first material is within plus or minus 10° C. of said softening temperature of said second material;
   wherein at least a portion of said second material transmits at least 50% of visible light and has a haze less than 50%;
   wherein said first material has a first solubility parameter ($\delta_1$) and said second material has a second solubility parameter ($\delta_2$), wherein ($\delta_i$) is within +/−5 units of ($\delta_2$) such that said first material does not separate from said second material; and
   wherein the flexural modulus of the first material has a value greater than 100,000 psi and the flexural modulus of the second material has a flexural modulus of less than 100,000 psi.

2. The animal chew of claim 1 wherein said first material has a first hardness and said second material has a second hardness, wherein said first hardness is greater than said second hardness.

3. The animal chew of claim 1 wherein said first material exhibits a Shore A durometer of greater than 70.

4. The animal chew of claim 1 wherein said second material exhibits a Shore A durometer of less than 100.

5. The animal chew of claim 1 wherein said first material comprises a luminescent additive; and said first material is at least partially visible through said second material.

6. The animal chew of claim 5 wherein said luminescent additive is phosphorescent.

7. The animal chew of claim 5 wherein said luminescent additive is fluorescent.

8. The animal chew of claim 1 wherein said first material comprises an attractant.

9. The animal chew of claim 1 wherein said second material comprises an attractant.

10. The animal chew of claim 1 wherein said first material has a first volumetric shrinkage and the second material has a second volumetric shrinkage, wherein said first volumetric shrinkage is less than said second volumetric shrinkage.

* * * * *